US007742638B2

(12) United States Patent
Estevez et al.

(10) Patent No.: US 7,742,638 B2
(45) Date of Patent: Jun. 22, 2010

(54) CONTENT-TRANSFORMATION POWER MANAGEMENT OF A MOBILE DISPLAY

(75) Inventors: Leonardo W. Estevez, Rowlett, TX (US); Shivshankar Ramamurthi, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 1024 days.

(21) Appl. No.: 11/380,336

(22) Filed: Apr. 26, 2006

(65) Prior Publication Data

US 2007/0268235 A1 Nov. 22, 2007

Related U.S. Application Data

(60) Provisional application No. 60/675,414, filed on Apr. 26, 2005.

(51) Int. Cl.
*G06K 9/00* (2006.01)

(52) U.S. Cl. ........................................ 382/168

(58) Field of Classification Search ................. 382/168, 382/162, 274–275, 305, 167; 345/102, 87, 345/89, 30, 55, 690–691, 558, 204; 709/238; 358/516–521; 348/222.1–223.1; 455/566
See application file for complete search history.

(56) References Cited

U.S. PATENT DOCUMENTS

| | | | | |
|---|---|---|---|---|
| 7,106,350 | B2 * | 9/2006 | Baba et al. | 345/691 |
| 7,512,704 | B2 * | 3/2009 | Nelson et al. | 709/238 |
| 2002/0003522 | A1 * | 1/2002 | Baba et al. | 345/89 |

OTHER PUBLICATIONS

Philips Research Press Release on Video Processing Techniques for Mobile Devices-http://www.research.philips.com/newscenter/archive/2004/videoprocessing.html.

* cited by examiner

*Primary Examiner*—Sherali Ishrat
(74) *Attorney, Agent, or Firm*—Wade J. Brady, III; Frederick J. Telecky, Jr.

(57) ABSTRACT

The present invention provides a video server. In one embodiment, the video server includes a perceptual analyzer configured to analyze frames of a video sequence and provide a video analysis file. The video server also includes a transmitter coupled to the perceptual analyzer and configured to transmit both the video sequence and the video analysis file. The present invention also provides a mobile client. In one embodiment, the mobile client includes a liquid crystal display (LCD) having a backlight and configured to provide a video sequence for the mobile client. The mobile client also includes a display processor, coupled to the LCD, configured to employ a received video analysis file to enhance at least one of a brightness and contrast of the video sequence and correspondingly reduce a backlight intensity of the backlight.

6 Claims, 2 Drawing Sheets

CONTENT-TRANSFORMATION POWER MANAGEMENT OF A MOBILE DISPLAY

CROSS-REFERENCE TO PROVISIONAL APPLICATION

This application claims the benefit of U.S. Provisional Application No. 60/675,414 entitled "LCD Power" to Leonardo W. Estevez and Shivshankar Ramamurthi, filed on Apr. 26, 2005, which is incorporated herein by reference in its entirety.

TECHNICAL FIELD OF THE INVENTION

The present invention is directed, in general, to video rendering and, more specifically, to a video server, a mobile client and methods of operating a video server and a mobile client.

BACKGROUND OF THE INVENTION

The proliferation of mobile devices incorporating displays, such as mobile phones, continues as the feature sets associated with these devices expand and improve. In the past, the display portion of the mobile device was mainly focused on allowing a user to select certain features of the mobile device. However, current growth in display and related technologies are moving the role of the display to become much more of a central feature of the mobile device.

The majority of mobile devices use a liquid crystal display (LCD). A popular form of LCD is a flat display, which typically consists of an array of red, green and blue color pixels that are arranged in front of a light source called a backlight. Each pixel contains a series of liquid crystal molecules arranged between two transparent electrodes and two polarizing filters having orthogonal polarizing directions. With no electric charge applied between the two electrodes, the liquid crystal molecules are oriented to prohibit the transmission of backlight.

Applying a charge, however, provides a reorientation of the liquid crystals that is proportional to the applied charge. This allows a proportional amount of backlighting to be transmitted through the pixel area. The amount of backlighting transmitted by a pixel determines a brightness of the image in that pixel area, as seen by an observer. The contrast associated with the image on the display corresponds to the range of actual backlighting transmitted by all pixels that compose the image. This range is typically a portion of the full range that is possible between zero and full reorientation of the liquid crystals. Therefore, an image rendered by the LCD is a function of the brightness, contrast and backlight intensity associated with the image.

An image histogram is a plot of the number of pixels associated with each brightness value actually occurring in the image. These brightness values typically range from zero to 255 along a brightness scale corresponding to eight bits of resolution. A brightness value of zero corresponds to the blackest black and a brightness value of 255 corresponds to the whitest white that are possible on a particular LCD. This histogram provides a luminance "finger print" for its corresponding image.

The demand for higher quality images is increasing. The quality of an image provided by an LCD is directly proportional to the number of pixels employed in the display. Additionally, the intensity of the backlight is often set as high as possible to make the display visible in high ambient light conditions, such as bright sunlight.

The amount of power used by the mobile device is a critical factor associated with most mobile devices, since size and weight constraints typically place severe restrictions on battery sizes. Currently, backlight power requirements for the LCD consume approximately 30 percent of the available battery power in a mobile phone. As mobile displays employ a more central role in more mobile devices, backlight power will become an even more critical issue.

Accordingly, what is needed in the art is a more power-efficient way of rendering images on a mobile LCD.

SUMMARY OF THE INVENTION

To address the above-discussed deficiencies of the prior art, the present invention provides a video server. In one embodiment, the video server includes a perceptual analyzer configured to analyze frames of a video sequence and provide a video analysis file. The video server also includes a transmitter coupled to the perceptual analyzer and configured to transmit both the video sequence and the video analysis file. The present invention also provides a mobile client. In one embodiment, the mobile client includes a liquid crystal display (LCD) having a backlight and configured to provide a video sequence for the mobile client. The mobile client also includes a display processor, coupled to the LCD, configured to employ a received video analysis file to enhance at least one of a brightness and contrast of the video sequence and correspondingly reduce a backlight intensity of the backlight.

In another aspect, the present invention provides a method of operating a video server. In one embodiment, the method includes analyzing frames of a video sequence and providing a video analysis file. The method also includes transmitting both the video sequence and the video analysis file. The present invention also includes a method of operating a mobile client. In one embodiment, the method includes providing a video sequence for the mobile client employing a liquid crystal display (LCD) having a backlight. The method also includes employing a received video analysis file to enhance at least one of a brightness and contrast of the video sequence and correspondingly reducing a backlight intensity of the backlight.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
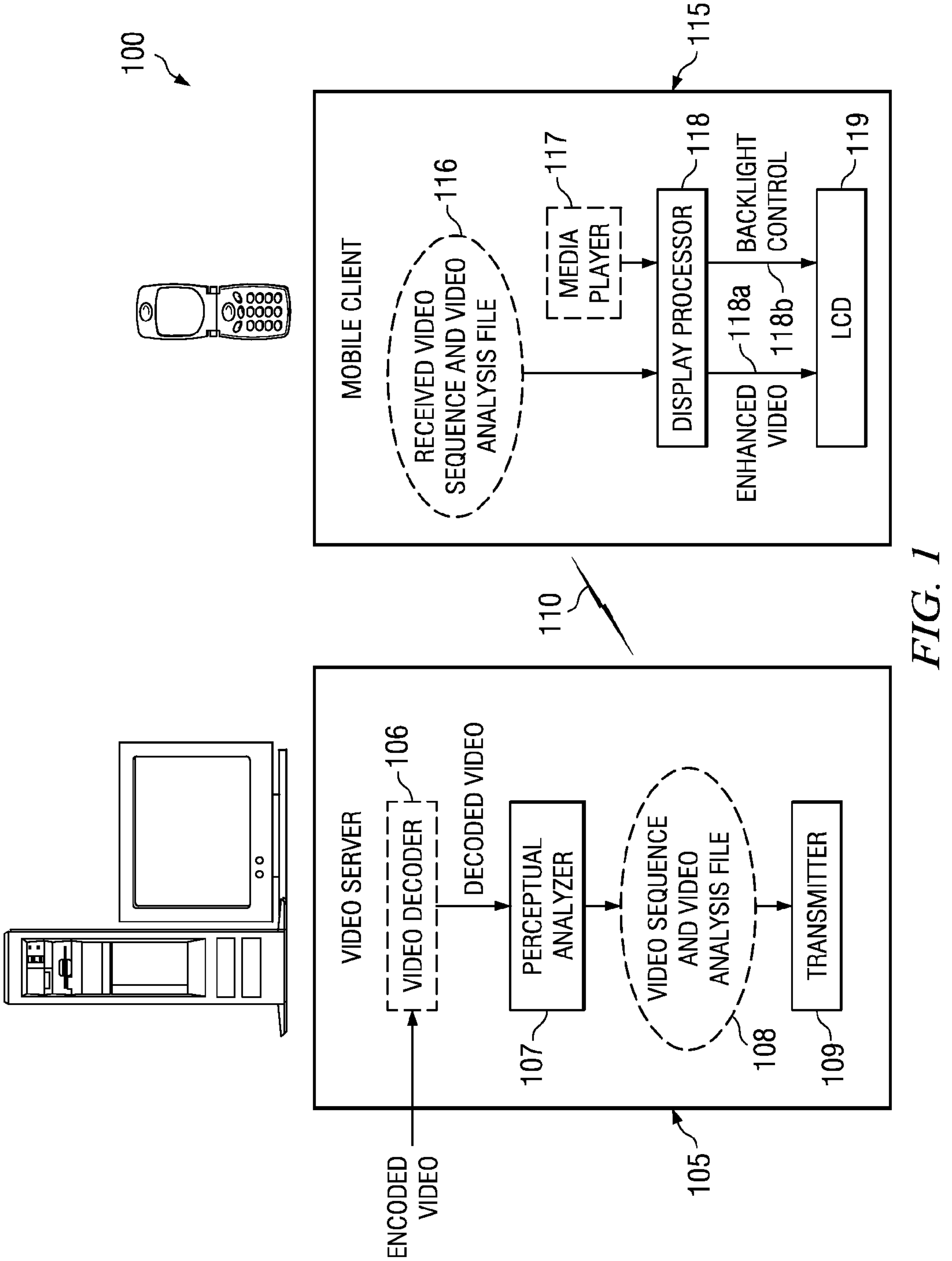
FIG. 1 illustrates a system as provided by one embodiment of the invention including a video server and a mobile client.

FIG. 1 illustrates a system 100 as provided by one embodiment of the invention. The system 100 includes a video server 105, a transmission link 110 and a mobile client 115. In the illustrated embodiment, the video server 105 employs a video decoder 106, which uses an encoded video input to provide an output decoded video stream. The video server includes a perceptual analyzer 107 that is coupled to the output decoded video stream, as shown. The perceptual analyzer 107 analyzes frames of a video sequence and provides the video sequence and a video analysis file in a video transmission file 108, resulting from the analysis, to a transmitter 109, which is also included in the video server 105. The transmission link 110 may be any of a number of existing transmission links that are employable to transmit a video sequence and a video analysis file from the video server 105 to the mobile client 115.

In the illustrated embodiment, the mobile client 115 employs a received video sequence and corresponding received video analysis file in a received video transmission file 116 that was transmitted from the video server 105. The mobile client 115 includes a display processor 118 and an LCD 119 that employs a backlight. The display processor 118 employs the received video analysis file to enhance at least one of a brightness value and a contrast range of the received video sequence. Additionally, the display processor 118 also reduces a backlight intensity of the backlight that corresponds to enhancement of one or both of the brightness and contrast. The LCD 119 renders the received video sequence under the direction of the display processor 118 employing an enhanced video output 118*a* and a backlight control 118*b*.

In general, embodiments of the present invention allow analysis of the video sequence on the remote server 105 in order to determine how the video sequence may be later processed in the display processor 118. Enhanced brightness and contrast on the LCD 119 along with a corresponding reduction in its backlight energy is then provided by the display processor 118. These enhancements and backlight intensity adjustments are subsequently adapted over time as the video is being rendered.

In the illustrated embodiment, the video decoder 106 converts a compressed video input into decoded video frames that can be displayed on a screen. Then, the perceptual analyzer 107 analyzes the brightness and contrast profiles for the video frames. In one embodiment, this analysis may be conducted by creating image histograms of each frame of the video sequence. Each image histogram is then analyzed to determine a pixel distribution that defines image characteristics for the frame. For example, a relevant height and width of the image histogram along with its location on the brightness scale may be determined that corresponds to the frame's luminance finger print. This frame analysis information is then indexed to that particular frame of the video sequence and recorded in the video analysis file.

The perceptual analyzer 107 also provides a frame-to-frame analysis corresponding to a series of frames. That is, histographic information may also be compared across frames to determine when major changes in pixel distributions occur, such as may occur at a scene change. This "look-ahead" frame analysis allows synchronization of the brightness and contrast enhancements along with backlight intensity modulations over a series of frames to be accommodated.

For example, this analysis may dictate that the image enhancements and corresponding backlight adaptations need to become either increasingly or decreasingly aggressive over frames associated with this transition area. This look-ahead frame analysis information is also indexed to that particular series of frames of the video sequence and recorded in the video analysis file. The video transmission file 108 consisting of the video sequence and the video analysis file are provided to the transmitter 109 for transmission to the mobile client 115.

The video transmission file 108 is received in the mobile client 115 as the received video transmission file 116 having a received video sequence and a received video analysis file. The received video sequence and received video analysis file are presented to the display processor 118, as shown. In the illustrated embodiment, the display processor 118 invokes a media player 117 that is associated with the format of the received video sequence to aid in its processing for display. Additionally, the display processor 118 incorporates scheduler functionality that may be external in other embodiments of the present invention.

The display processor 118 performs the role of enhancing at least one of a brightness and contrast of the received video sequence and correspondingly reducing the backlight intensity of the LCD 119. This role is performed with the objective of maintaining the textural information of the video image in a way that is perceptually acceptable to a user of the mobile client 115. In one embodiment, a user preference may be employed to determine to what degree and at what battery status the textural information is allowed to degrade. User preference and battery status may also be employed to determine the extent or degree of image enhancement with respect to brightness or contrast as well as modulation of backlight intensity. In another embodiment, decisions regarding these functionalities are delegated to the display processor 118.

The received video analysis file is employed to determine how each frame of the received video sequence is to be rendered on the LCD 119. As a general approach to processing the received video sequence, the display processor 118 uses the frame analysis information to determine how much enhancement in brightness is possible. Consider, for example, where the histographic information indexed for a frame in the received video analysis file indicates that most or all of its pixel distribution is at the low end of the brightness scale. Then the pixel distribution may be skewed to the high end of the brightness scale and the backlight intensity proportionally reduced to render an enhanced brightness on the LCD 119 that is perceptually close to the original brightness.

This skewing of the image distribution and corresponding reduction of the backlighting intensity will also accommodate other pixel distributions that do not significantly embody full brightness (255) on the image histogram. For cases where the pixel distribution is broad thereby covering a large portion of the brightness scale, a reduction in its width provides room for skewing up the brightness scale and reducing backlight intensity. This reduction in width may occur at a portion or in several portions of the pixel distribution that is relative flat thereby reducing its perceptual impact. This skewing based on width reduction corresponds to a reduction in overall contrast, but allows enhancement of brightness without degrading contrast perceptibly. For pixel distributions that are very narrow, they may be broadened to enhance contrast of the image and allow a reduction of backlight intensity either with or without skewing of the pixel distribution.

The display processor 118 employs the look-ahead frame analysis information of the received video analysis file to determine how to manage significant changes in pixel distributions from frame-to-frame. These pixel distribution transitions may indicate a scene change, or they may indicate introduction of an object on the image that has a significantly different brightness from the image background. The look-ahead frame analysis information allows the display processor 118 to distinguish these or other frame-to-frame scenarios and provide enhanced image and backlight modulation for these video sequence situations.

Figure 2A:
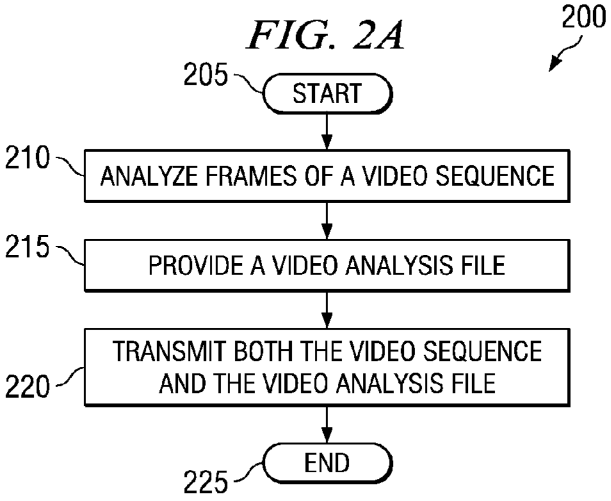
FIGS. 2A and 2B illustrate flow diagrams of respective embodiments of methods of operating a video server and of operating a mobile client carried out in accordance with the principles of the present invention.
Figure 2B:
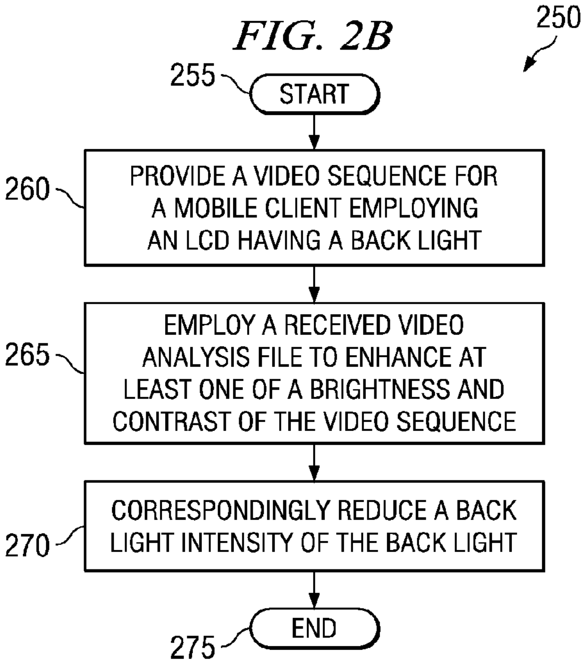

FIGS. 2A and 2B illustrate flow diagrams of respective embodiments of methods of operating a video server and of operating a mobile client, generally designated 200 and 250, carried out in accordance with the principles of the present invention.

The method 200 is for use with pre-recorded video and starts in a step 205. Then, in a step 210, frames of a video sequence are analyzed. Analysis of the video sequence includes analyzing brightness and contrast characteristics of the frames of the video sequence. In one embodiment, image histograms of the frames are created and analyzed to determine the brightness and contrast characteristics of the frames. Additionally, the image histograms are employed to determine scene transitions in the video sequence.

Then, a video analysis file, resulting from the analysis of the video sequence in the step 210, is provided in a step 215. The video analysis file provides an analysis that is indexed to the video sequence for both frame and frame-to-frame situations. Both the video sequence and the video analysis file are transmitted to a mobile client having an LCD in a step 220. This transmission may employ any of a number of existing transmission schemes that will accommodate the video sequence and the video analysis file. The method 200 ends in a step 225.

The method 250 is for use with pre-recorded video to be rendered in a mobile client and starts in a step 255. Then, in a step 260, a video sequence is provided to the mobile client wherein the mobile client employs an LCD having a backlight to render the video sequence. A received video analysis file is employed to enhance at least one of a brightness and a contrast of the video sequence in a step 265, and correspondingly reduce a backlight intensity of the backlight in a step 270. In the illustrated embodiment, the video analysis file corresponds to the video sequence, and the video analysis file and the video sequence are received concurrently from a video server.

In the illustrated embodiment, an extent or degree of enhancement of brightness or contrast of the video sequence is determined automatically in the mobile client. In this instance, the extent or degree of modulation of the backlight intensity corresponding to the enhanced brightness or contrast is also determined automatically. In an alternative embodiment, both the extent and degree of enhancement of the brightness or contrast and the corresponding modulation of backlight intensity are configurable. In one case, at least one of the extent or degree of enhancement and modulation may be configured based on a preference of a user of the mobile client. Additionally, at least one of the extent or degree of enhancement and modulation may be configured based on a battery status of the mobile client. The method 250 ends in a step 275.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a video server, a mobile client and methods of operating a video server and a mobile client have been presented. Advantages include employing an existing video streaming infrastructure to allow an analysis of a video sequence offline in a video server. Then, the video sequence along with a resulting video analysis file, which is indexed to the video sequence, can be transmitted via any channel to the mobile client.

The mobile client employs a display processor, which uses the received video analysis file to enhance the received video sequence for rendering on an LED in the mobile client. Embodiments of the present invention may trade some brightness and contrast of the video sequence over time in order to reduce a backlight power required in the LED. These embodiments provide an extended or more predictive power capability for the mobile client. This aspect of power management allows increased assurance that a user of the mobile client is able to finish watching a program of interest.

Those skilled in the art to which the invention relates will appreciate that other and further additions, deletions, substitutions and modifications may be made to the described embodiments without departing from the scope of the invention.

What is claimed is:

1. A mobile client, comprising:

a liquid crystal display (LCD) having a backlight and configured to provide a video sequence for said mobile client and;

a display processor coupled to said LCD and configured to employ a received video analysis file to enhance at least one of a brightness and contrast of said video sequence and correspondingly reduce a backlight intensity of said backlight;

wherein said video analysis file corresponds to said video sequence and said video sequence and said video analysis file are received from a video server, said video sequence including a plurality of video frames and said video analysis file containing information corresponding to brightness and contrast profiles for the video frames in said video sequence.

2. The client as recited in claim 1 wherein an extent or degree of enhancement of brightness or contrast is configurable based on at least one of a user preference and a battery status.

3. The client as recited in claim 1 wherein an extent or degree of modulation of said backlight intensity is configurable based on at least one of a user preference and a battery status.

4. A method of operating a mobile client, comprising:

providing a video sequence for said mobile client employing a liquid crystal display (LCD) having a backlight; and employing a received video analysis file to enhance at least one of a brightness and contrast of said video sequence and correspondingly reducing a backlight intensity of said backlight;

wherein said video analysis file corresponds to said video sequence and said video sequence and said video analysis file are received from a video server, said video sequence including a plurality of video frames and said video analysis file containing information corresponding to brightness and contrast profiles for the video frames in said video sequence.

5. The method as recited in claim 4 wherein an extent or degree of enhancement of brightness or contrast is configurable based on at least one of a user preference and a battery status.

6. The client as recited in claim 4 wherein an extent or degree of modulation of said backlight intensity is configurable based on at least one of a user preference and a battery status.

* * * * *